United States Patent [19]
Kettering

[11] 3,883,879
[45] May 13, 1975

[54] PORTABLE PANTOGRAPH C-SCAN RECORDING FLAW DETECTING SYSTEM

[75] Inventor: Donald D. Kettering, Stony Brook, N.Y.

[73] Assignee: The United States of America as represented by the Secretary of the Air Force, Washington, D.C.

[22] Filed: Aug. 28, 1973

[21] Appl. No.: 392,384

[52] U.S. Cl.............. 346/33 F; 33/25 C; 73/67.8 S; 346/141
[51] Int. Cl......................... G01d 5/02; G01n 29/04
[58] Field of Search......... 346/33 F, 141; 73/67.8 S, 73/67.9; 33/25 B, 25 C

[56]  References Cited
UNITED STATES PATENTS

| | | | |
|---|---|---|---|
| 2,770,966 | 11/1956 | Halliday et al. | 73/67.9 |
| 3,121,138 | 2/1964 | Murphy | 178/5.2 |
| 3,585,851 | 6/1971 | Walther | 73/67.8 |

Primary Examiner—Joseph W. Hartary
Attorney, Agent, or Firm—Harry A. Herbert, Jr.; Robert Kern Duncan

[57] ABSTRACT

A portable, manually scanned, ultrasonic flaw detecting and recording system comprising a suction cup attaching pantograph supporting a transducer head and writing pen for the in-place testing of panels is disclosed.

1 Claim, 7 Drawing Figures

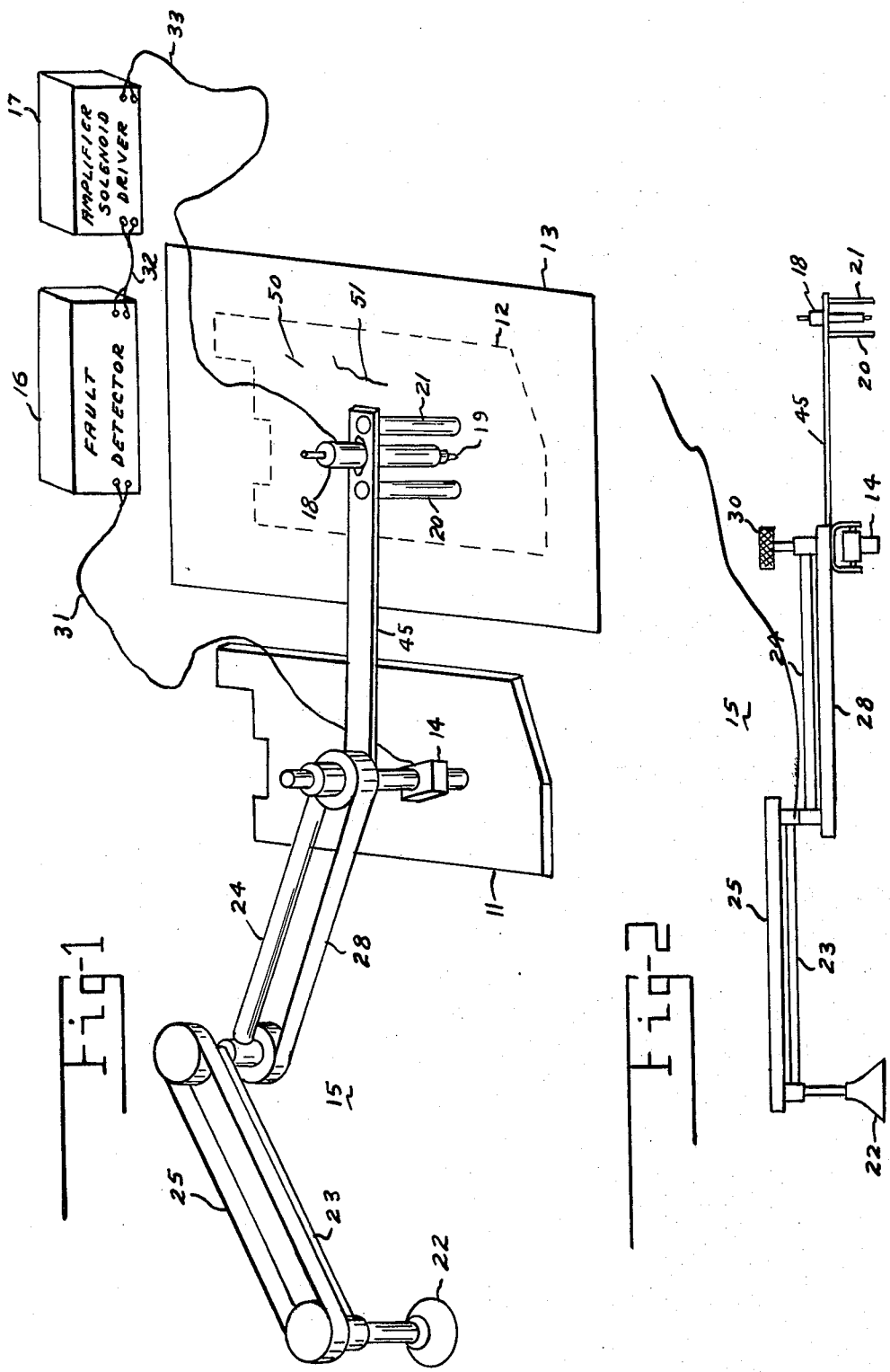

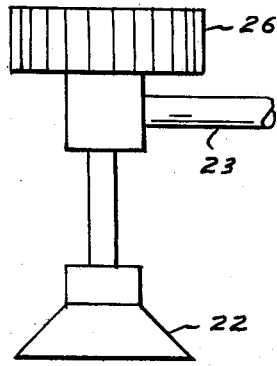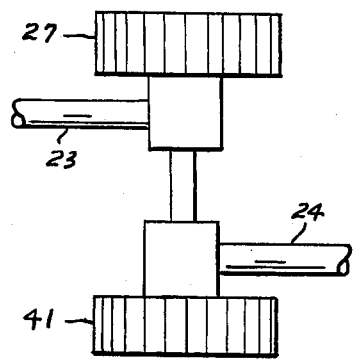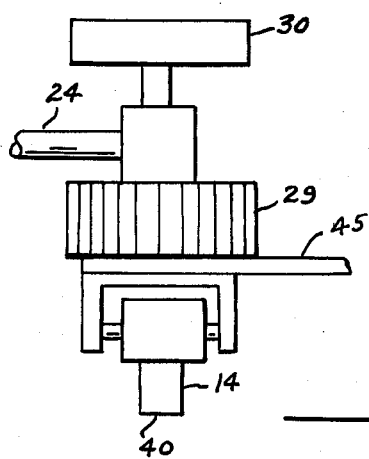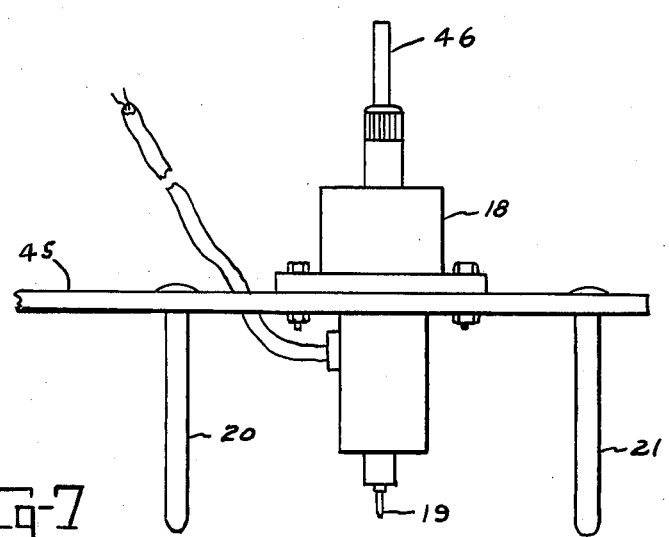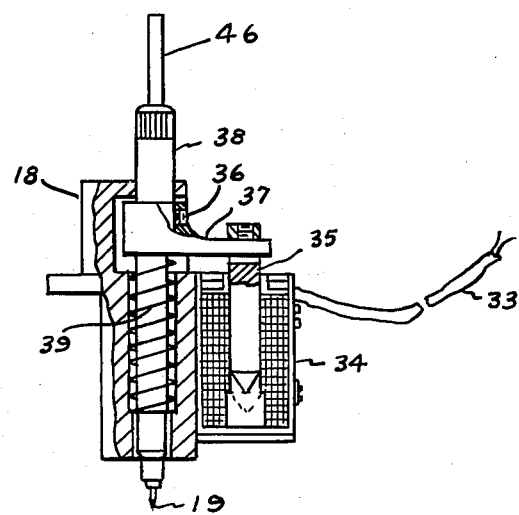

PORTABLE PANTOGRAPH C-SCAN RECORDING FLAW DETECTING SYSTEM

BACKGROUND OF THE INVENTION

The field of the invention is in portable flaw detection equipment.

Ultrasonic flaw detecting and recording equipment is well known. However, the prior art devices are large, usually require an immersion tank, and are generally not suited for field testing of in-place panels. Pantograph devices such as used as a component of the invention are perhaps best known for their usage in drafting machines, such as exemplified by U.S. Pat. No. 2,481,666 to J. A. Hislop.

SUMMARY OF THE INVENTION

Flaw detection and recording apparatus is disclosed which may expediently be used to detect and plot flaws in panels that are installed. It is particularly suited for the examination of in use structures such as aircraft panels on an airplane. A plot of the location of any loose bonds is provided from which the seriousness of the defect may readily be judged.

BRIEF DESCRIPTION OF THE DRAWING

FIG. 1 is a pictorial view of a typical set-up of the apparatus of the invention for examination of a panel for defects;

FIG. 2 is a representative pictorial elevation view of a typical embodiment of pantograph, transducer, and writing pen assembly;

FIG. 3 is a pictorial view of the suction cup and fixed pivot assembly of a pantograph;

FIG. 4 is a pictorial view of a middle pivot of a pantograph;

FIG. 5 is a pictorial view of the transducer and movable pivot assembly of a pantograph;

FIG. 6 is a pictorial view of the recording pen unit; and

FIG. 7 is a partial section schematic representation of a typical pen and solenoid drive assembly.

DESCRIPTION OF THE PREFERRED EMBODIMENT

Ultrasonic sound waves have been previously used for the nondestructive inspection of structures for defects. Generally the structures are examined in a laboratory prior to their final assembly in the device in which the structures are to be used. The laboratory equipment is large, complex, and the inspection is thorough but very time consuming. It generally involves immersion of the structure to be tested in a water tank.

It is equally desirable to nondestructively test structures, such as panels of aircraft, airdrop platforms, shelter walks, tank containers, etc., for debonds, or delaminations in the facing sheet, or the bond line of honeycomb panels, after fabrication is complete and also later in time after the structure has been in operational usage. Until the present invention there has not been any apparatus available with which to expediently inspect for structural defects an in-place structure such as an installed wing panel of an aircraft.

A representative pictorial view of typical apparatus constituting an embodiment of the invention is shown in FIG. 1. A modified conventional pantograph, commonly known as a "drafting machine," is a necessary element of the invention. The fixed pivot end of the pantograph that is conventionally attached to the drafting table is modified by removing the table clamping mechanism and attaching the rubber suction cup 22. A permanent magnet may be used in place of the suction cup for attachment to magnetic surfaces. The scanning or movable pivot end of the pantograph has a conventional fault detecting sensor 14 mounted on the pantograph bearing axis as shown in detail in FIG. 5. The fault detector may either be a conventional ultrasonic unit or an eddy current unit. The pantograph has conventional spacing rods 23 and 24 supporting the middle hinge linkage point. Conventional timing belts 25 and 28 linking the sprockets 26 and 27, and the sprockets 29 and 41 respectively, are shown in detail in FIGS. 3, 4 and 5. The hand wheel 30 used by the operator to scan the transducer 14 over the surface being examined is not shown in FIG. 1. In a typical embodiment of the invention using a modified parallel motion mechanism of a conventional drafting machine for the pantograph, the conventional drafting straight edge was removed from the instrument and replaced with a blade 45 approximately two feet long which carries the marking pen and solenoid drive assembly 18. It is readily seen, once the relative position is established between the sensor 14 and the writing pen 19, that the vectors of movement of the two points will always be identical because the timing sprockets, or pulleys, 26, 27, 29, and 41 are the same diameter and are connected by the timing belts 25 and 28 so that sprockets 26 and 27 rotate together and 41 and 29 rotate together. Thus, the blade 45, like the straight edge of the drafting machine, will always maintain a parallel relationship.

The writing pen and solenoid pen driver 18 are shown as mounted at the end of the blade 45 in enlarged view in FIG. 6. A typical solenoid and pen are shown in detail in FIG. 7. The support rods 20 and 21 slide over the paper and position the pen writing tip 19 over the paper. The pen retracting spring 39 holds the tip 19 of the pen above the paper and the plunger out of the solenoid until the solenoid 34 is electrically activated. When a flaw is detected by the sensor in the structure being tested, the solenoid is energized pulling the solenoid plunger 35 into the solenoid and through connecting link 37 attaching the pen to the plunger, the pen 38 is moved vertically downward against the force of spring 39 until the tip 19 of the pen contacts the paper marking on the paper a position record of the flaw. A conventional ballpoint 38 pen has been found to be a suitable marking instrument.

In a typical embodiment of the invention, as shown in FIG. 1, the sensor 14 may be a conventional flaw detecting piezoelectric transducer, which is electrically pulsed by conventional fault detecting equipment 16. The transducer then vibrates at its own natural frequency giving off a short burst of sound waves. Returning echoes of sound energy are then picked up by the transducer and transmitted as electrical energy pulses to the detecting equipment. If the portion of the sound wave entering the structure being tested encounters no interference in the form of a discontinuity in the material, it will continue until it is partially reflected from the back surface as a second echo or back reflection. (The first echo is from the front surface.) If there is a discontinuity in the interior, a portion of the sound energy will be reflected from the discontinuity and will return to the transducer as a separate echo between the echoes received from the front and back surfaces. When a reflection from a discontinuity such as a debond, a crack or separation, occurs, the fault detector 16 sends a signal in line 32 to the conventional solenoid driver 17 which in turn, by a signal in line 33, energizes the solenoid pen driver actuating to writing engagement the pen and causing the pen to mark the paper at a position corresponding to the location of the flow in the structure.

In using the apparatus for examining, for example, a particular wing panel 11, the suction cup 22 is attached to the wing, in the conventional manner, in proximity to the panel 11 so that the sensor 14 may be manually scanned over the entire panel by the operator's moving the sensor by holding and moving knob 30. A previously prepared, outline 12 of the panel on conventional paper 13 is attached to the wing adjacent to the panel being tested such that the pen will follow the panel outline edges as the sensor is moved along the edges of the panel. An alternative way to outline the panel on the paper is to push down and hold down the top of the pen 46 so that the point of the pen 19 touches the paper and outlines the panel on the paper as the sensor is moved along the edges of the panel. With either procedure the pen will then always be in a one-to-one position correspondence over the panel outline on the paper with the location of the sensor over the panel.

The sensor is now manually scanned over the panel, vertically, horizontally, randomly, or in any manner desired in accord with the magnitude of diligence permitted by the degree of expediency available. When the sensor is passed over a flaw or fault, the fault detector 16 provides a signal on line 32 to the solenoid driver amplifier 17 which will energize the pen solenoid causing the pen to make a mark on the paper such as indicated by lines 50 and 51. The record thus provided is conventionally known as a C-scan recording. It is to be noted that, once an indication of a flaw is detected, the area in the vicinity of the flaw may be as diligently inspected as desired without wasting time over good areas. Knowing the location and extent of the defect, the seriousness to the oepration of the device having the defective panel may be ascertained.

It is required, for an ultrasonic transducer type sensor to operate effectively, that the transducer be adequately coupled to the structure being tested. In the laboratory equipment where the specimen under test is immersed in a tank of water, the layer of water between the transducer and the surface of the structure being tested provides the coupling. In using an ultrasonic transducer for the sensor in the portable apparatus of this invention, a coupling fluid is generally required between the face of the transducer 40 and the surface of the structure being tested. This fluid between the transducer and the surface need be only a very thin film. When water is used, the water between the transducer head and the surface is frequently called a "water cell." A small stream of water may be directed either adjacent or through the transducer surface to provide this water cell coupling of the transducer to the surface. Glycerin, light oil, or a light grease, coated over the surface being tested has also been found to provide generally satisfactory coupling. Minor variations in the length of the path through the coupling liquid or fluid have been found to have very little effect on the sensitivity of the apparatus.

This invention is substantially a new combination of well known elements to provide a new and useful system that has heretofore been unavailable.

I claim:

1. A portable manually scanned flaw detecting and recording system for recording on a sheet of paper, in one-to-one correspondence; flaws in a structure below a determined area of the surface of the said structure being tested for flaw defects, the said system comprising:
    a. a parallel motion mechanism having a fixed pivot and a movable pivot with a blade, moving in parallel relationship, having a first end and a second end attached at the said first end to the said movable pivot;
    b. a suction cup attached at the said fixed pivot of the parallel motion mechanism to removably attach the said mechanism to the said surface of the said structure being tested;
    c. a flaw sensor attached to the said movable pivot and positioned in detecting relationship to the said surface of the said structure, providing an electrical output indication of a flaw in the said structure;
    d. a hand wheel attached to the said movable pivot for manually scanning the said sensor over the said determined area;
    e. a writing pen;
    f. means for positioning the said writing pen at the said second end of the said blade, the said positioning means including;
        1. a retracting spring holding the tip of the said pen above the said paper,
        2. a solenoid having a plunger attached to the said pen for moving the said pen against the force of the said retracting spring into writing engagement on the said paper when the said solenoid is energized,
        3. a support rod positioning the writing tip of the said pen over and away from the said sheet of paper when the said solenoid is not energized,
        4. means for manually engaging the said pen into writing relationship on the said paper; and
    g. means cooperating with the output of the said flaw sensor and the said solenoid for energizing the said solenoid when the said sensor is passed over a flaw.

* * * * *